United States Patent [19]

Hara

[11] 4,392,906

[45] Jul. 12, 1983

[54] METHOD OF AND APPARATUS FOR MANUFACTURING FASTENER ASSEMBLIES

[75] Inventor: Saburo Hara, Tokyo, Japan

[73] Assignees: Toska Co., Ltd.; Japan Bano'k Co., Ltd., both of Tokyo, Japan; Ben Clements & Sons, Inc., Hackensack, N.J.

[21] Appl. No.: 300,523

[22] Filed: Sep. 9, 1981

[51] Int. Cl.³ .................. B32B 31/18; B32B 31/26
[52] U.S. Cl. .................... 156/250; 24/150 FP; 24/201 A; 156/264; 156/304.1; 156/304.6; 156/510; 156/512; 156/517; 156/563
[58] Field of Search .............. 156/91, 92, 93, 250, 156/261, 264, 304.1, 304.6, 510, 512, 517, 528, 558, 559, 563, 566; 24/150 FP, 201 R, 203 R, 204; 29/412, 417, 433; 264/152, 153; 425/292, 298, 300; 428/33, 194, 198

[56] References Cited

U.S. PATENT DOCUMENTS

| | | | |
|---|---|---|---|
| 2,973,797 | 3/1961 | Sylvester | 156/563 |
| 3,348,669 | 10/1967 | Powers | 29/417 |
| 3,380,122 | 4/1968 | Kirk | 425/408 |
| 3,850,297 | 11/1974 | Meiser | 24/201 A |
| 4,121,487 | 10/1978 | Bone | 24/150 FP |
| 4,143,113 | 3/1979 | Suzuki | 24/150 FP |
| 4,285,754 | 8/1981 | Di Matteo | 156/264 |

Primary Examiner—Caleb Weston
Attorney, Agent, or Firm—Blum, Kaplan, Friedman, Silberman & Beran

[57] ABSTRACT

A plurality of fasteners are joined together as they are laminated in the direction of the thickness thereof, to form a fastener assembly. Each of the fasteners consists of a substantially H-shaped body composed of a head section, a bar section opposed to the head section, and a filament section by which the head section and bar section are joined together. Each of the fasteners is obtained by punching a film or a sheet of a synthetic resin. After a plurality of such fasteners as described above have been laminated in the direction of the thickness thereof, the bar sections are fused together in such a manner that the fasteners can be separated one by one.

8 Claims, 10 Drawing Figures

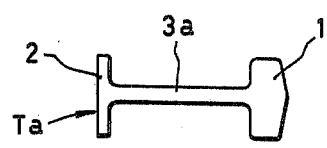
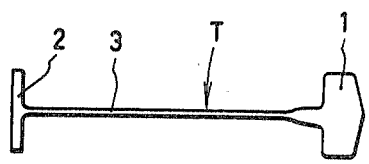
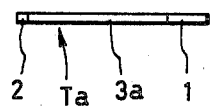
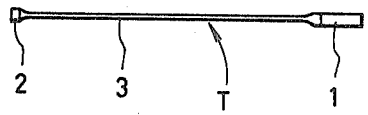
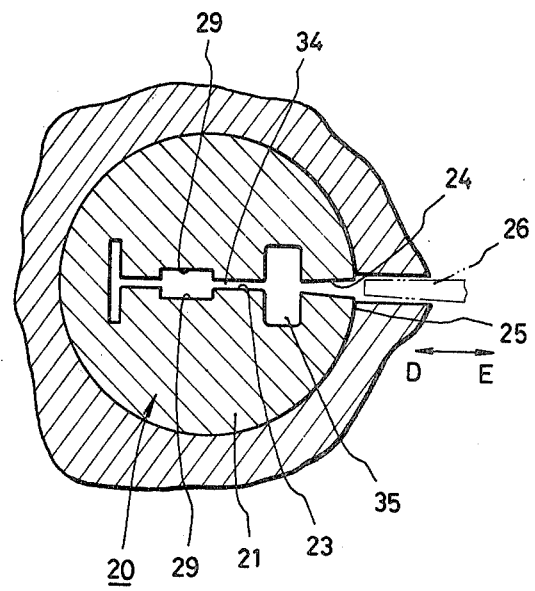

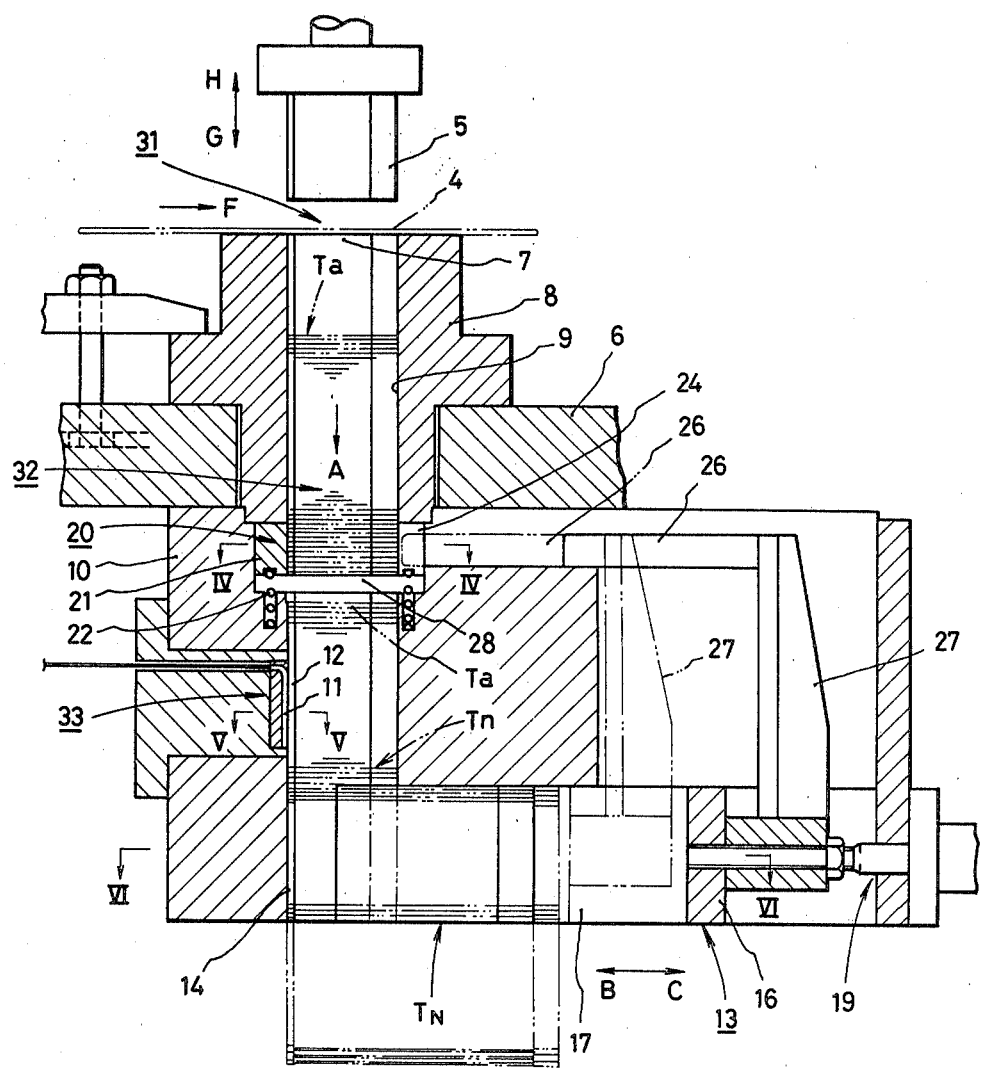

METHOD OF AND APPARATUS FOR MANUFACTURING FASTENER ASSEMBLIES

BACKGROUND OF THE INVENTION

1. Field of the Invention

This invention relates to a method of and an apparatus for manufacturing fastener assemblies each of which consists of a plurality of fasteners joined together as they are laminated in the direction of the thickness thereof.

2. Description of the Prior Art

A fastener of a synthetic resin shaped in its entirety substantially like the letter "H" is known, which consists of a head section, a bar section, and a filament section by which the head section and bar section are joined together. Such a fastener is used mainly as a connector for attaching a price tag to an article of commerce. The following is a mode in general use of attaching a price tag to an article by means of the above-mentioned fastener. A fastener assembly consisting of a plurality of fasteners joined together is put into an insert port of a tag attacher provided with a needle having a substantially C-shaped cross section. A price tag is then put on the needle while letting the latter to break through the former, and the resulting needle is inserted through an article, such as a clothing item. One piece of fastener is then separated from the fastener assembly, and a bar section thereof is forced into the needle to be moved therethrough. As the bar section of the fastener is moved through the needle, a part of a filament section thereof is passed through the price tag and article. When the bar section has come out of the needle, it is returned to the state owing to the elastic force of the filament section, so that the fastener regains substantially H-shaped configuration. The needle is thereafter drawn out from the article and price tag.

The fastener used as a connector in the above-mentioned manner, which permits simplifying a price tag attaching operation, which has long been carried out with a sewing thread, has attracted public attention and been used in large quantities in price tag attaching operations for ready-made clothes. Under the circumstances, it is strongly demanded that an improvement in the fastener of this kind be provided, which can be handled easily, attached to an article by a tag attacher at a high efficiency and obtained at a low price.

Since a conventional fastener assembly, which consists of a plurality of fasteners joined to a runner or a rod like the teeth of a comb, is manufactured by an injection molding machine, it is difficult to reduce the distance between adjacent fasteners. Unless partition walls are provided among cavities for forming fasteners in a metal mold to be used for molding such a faster assembly as mentioned above, fasteners formed independently of one another cannot be obtained. Accordingly, it is strictly necessary spaces for providing the partition walls be reserved in the mold. Consequently, a fastener assembly, in which the fasteners are spaced from one another by a distance equal to the thickness of a thicker portion of each fastener, i.e. the head or bar section thereof plus the thickness of the partition wall referred to above, is obtained.

In other words, a fastener assembly having too large a distance between adjacent fasteners is naturally produced. This causes the following problems:

(1) Due to the too large distance between the adjacent fasteners, the fasteners are intertwined while the fastener assemblies are transported from a manufacturing company to a user. Such fastener assemblies are difficult to be handled.

(2) Since the overall dimensions of a fastener assembly are limited by those of a metal mold, a fastener assembly having over 50-60 fasteners cannot be molded. This causes the number of operations for inserting fastener assemblies into a tag attacher to be increased, so that a price tag attaching operation cannot be carried out efficiently.

(3) The connecting members are left over after the fasteners have been separated from the fastener assembly during a price tag attaching operation. In other words, this type of fastener assemblies are wasteful of material.

Since the number of fastener assemblies being put to practical use is extremely large, the above problems have proved to be very serious, and it has been desired that solutions to be problems be found as early as possible.

SUMMARY OF THE INVENTION

An object of the present invention is to provide a method of and an apparatus for manufacturing fastener assemblies which are free from the intertwinement of the fasteners during the transportation of the fastener assemblies or a price tag attaching operation using the same and which can be handled easily.

Another object of the present invention is to provide a method of and an apparatus for manufacturing fastener assemblies at a low cost.

Still another object of the present invention is to provide a method of and an apparatus for manufacturing fastener assemblies which permit carrying out a price tag attaching operation at a high efficiency.

The characteristics of the present invention reside in that fasteners are punched out of films or sheets of a synthetic resin, laminated in the direction of the thickness thereof by a laminating means, and then joined together in such a manner that the fasteners can be separated one by one.

The "punching" referred to in this specification means not only blanking fasteners out of a sheet of a synthetic resin by using a press but also forming fasteners by imparting an impact on similar sheet materials or by cutting such materials with an edged tool, such as a cutter.

The "laminating" referred to in this specification means piling fasteners in the direction of the thickness thereof in a contacting state or in a non-contacting state.

The above and other objects as well as advantageous features of the invention will become apparent from the following description of the preferred embodiments taken in conjunction with the accompanying drawings.

BRIEF DESCRIPTION OF THE DRAWINGS

FIG. 1(A) is a plan view of a fastener in a non-stretched state;

FIG. 1(B) is a side elevational view of the fastener shown in FIG. 1(A);

FIG. 2(A) is a plan view of a fastener in a stretched state;

FIG. 2(B) is a side elevational view of the fastener shown in FIG. 2(A);

FIG. 3 is a longitudinal sectional view of an apparatus for manufacturing fastener assemblies according to the present invention;

FIG. 4 is a sectional view taken along the line IV—IV in FIG. 3;

DESCRIPTION OF THE PREFERRED EMBODIMENTS

Figure 5:
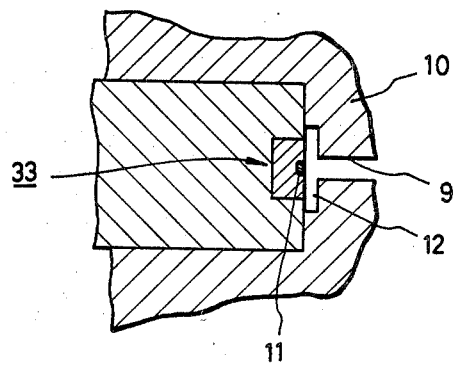
FIG. 5 is a sectional view taken along the line V—V if FIG. 3.

A fastener Ta shown in FIGS. 1(A) and 1(B), which has not yet been subjected to stretching treatment, consists of a head section 1, a bar section 2 opposed to the head section 1, and a filament section 3a by which the head section 1 and bar section 2 are joined together, and is shaped substantially like the letter "H".

Although the fastener Ta in a non-stretched state can be used as it is, the filament section 3a thereof may be stretched several times, before the fastener Ta has been practically used, to be formed into such a shape that is similar to the shape of the filament section 3 of the fastener T shown in FIGS. 2(A) and 2(B).

A fastener assembly manufacturing apparatus according to the present invention, which is shown in FIGS. 3-6, consists of a punching unit 31, a laminating unit 32, a unit 33 for joining fasteners together separably, and a stretching unit 13.

The punching unit 31, which is clearly seen from FIG. 3, consists of a punch 5 fixed to a ram of a press, and a die 8 opposed to the punch 5 and fixed to a bed 6 of the press. The die 8 is provided with a punching hole 7 the shape of which is identical with that of the fastener Ta shown in FIG. 1(A). The cross-sectional shape of the punch 5 is identical with the shape of the punching hole 7 but a cross-sectional area of the punch 5 is smaller than that of the punching hole 7 by a cross-sectional area of a clearance between the punch 5 and die 8.

The laminating unit 32 consists of a guide bore 9 which is formed by extending the punching hold 7 in the downward direction while retaining the cross-sectional shape thereof. The unit 33 for joining fasteners together separably consists of a heater 11 provided in a body 10 fixed to a lower portion of the die 8. The body 10 is provided with a guide bore 9 just as the laminating unit 32. As may be understood from FIGS. 3 and 5, the heater 11 is provided at an end portion of a laterally wide groove 12, which constitutes a part of the guide bore 9, i.e. a groove through which the bar section 2 of the fastener Ta is passed, the heater 11 being extended in the direction of the fastener Ta. As shown in FIG. 5, the heater 11 is positioned at an intermediate portion of the laterally wide groove 12 in such a manner that the heater is projected slightly into the groove 12 so as to contact the bar section 2 of the fastener Ta.

The stretching unit 13 consists of the body 10, and a movable member 16 adapted to be moved slidingly in the body 10 in the directions of a dual arrow B-C. The body 10 is provided therein with a laterally wide groove 14 communicated with and similar to the laterally wide groove 12, and a groove 15 through which a part of the filament section 3a is passed. On the other hand, the movable member 16 is provided therein with a groove 17 adapted to guide the head section 1 of the fastener, and capable of catching the head section 1 when the movable member 16 is displaced in the direction C of the dual arrow B-C, and releasing the head section 1 when the movable member 16 is displaced in the direction B of the dual arrow B-C, and a groove 18 communicated with the groove 17 and allowing a part of the filament section 3a of the fastener to be passed therethrough.

Reference numeral 14a denotes a stepped portion of the groove 14 for supporting the bar section 2 of the fastener while the fastener is stretched, and 17a a stepped portion of the groove 17 for supporting the head section 1 of the fastener while the fastener is stretched. The movable member 16 is displaced in the directions of the dual arrow B-C by a cylinder 19.

On the other hand, a pool unit 20 is provided between the laminating unit 32 and joining unit 33. The pool unit 20 consists of a cylindrical pool block 21 as may be understood from FIGS. 3 and 4. The pool block 21 is so fitted in the body 10 that the pool block 10 can be moved up and down, and it is urged constantly in the upward direction by a spring 22. The pool block 21 is positioned just under the guide bore 9, and has a holding bore 23. The holding bore 23 has the same shape as the fastener Ta just as the guide bore 9. However, the width of that portion 34 of the holding bore 23 through which the filament section 3a of the fastener is passed is slightly smaller than that of the filament section 3a, and the width of that portion 35 of the holding bore 23 through which the head section 1 of the fastener is passed is slightly smaller than that of the head section 1. The pool block 21 is also provided with a tapered groove 24 aligned with the portion 34 of the bore 23 and communicated with the portion 35 thereof. There is a narrow clearance 25 between engagement portions of the body 10 and pool block 21. A wedge 26 is provided in that portion of the body 10 which is opposed to the tapered groove 24, in such a manner that the wedge 26 can be moved in the directions of a dual arrow D-E. The wedge 26 is operatively connected to the cylinder 19 via a bracket 27. The wedge 26 and cylinder 19 have such positional relationship that, when the movable member 16 is displaced by the cylinder 19 to a forward limit position (a position shown in phantom in FIG. 6) in the direction B of the dual arrow B-C, the wedge 26 thrusts itself into the tapered groove 24 to expand the pool block 21, and that, when the cylinder 19 is moved in the direction C of the dual arrow B-C, the wedge 26 is moved in the direction E of the dual arrow D-E to allow the wedge 26 to come out of the tapered groove 24.

The portion 34 of the holding bore 23 is provided with recesses 29 at both sides thereof. When the filament section 3a of the fastener is subjected to a hot stretching operation, hot air is supplied into the recesses 29. Instead of supplying hot air into the recesses 29, heaters may be provided therein to heat the filament section 3a of the fastener.

A clearance 28 is formed between the body 10 and pool unit 20.

A method of manufacturing fastener assemblies using the apparatus of the above-described construction will now be described:

A film or a sheet 4 of a stretchable synthetic resin, such as polyamide is fed intermittently in the direction of an arrow F. When the punching unit 31 is actuated in accordance with a feed motion of the film or sheet 4, the punch 5 is moved up and down in the directions of a dual arrow G-H, and a fastener Ta as shown in FIGS. 1(A) and 1(B) is punched out from the film or sheet 4 by the shearing effect of the punch 5 and die 8. During the punching operation, a lower end portion of the punch 5 enters the interior of the punching hole 7 in the die 8 to allow the fastener Ta to be lowered into the guide bore 9 by the lower end surface of the punch 5. As such punching operations are repeated, fasteners Ta are accumulated in the guide bore 9, the fasteners Ta being laminated in the direction of the thickness thereof. It is preferable that a bar member (not shown) is inserted beforehand into the guide bore 9 from the side of the stretching unit 13 to support the fasteners Ta in a horizontal state. The bar member is lowered gradually, and withdrawn from the guide bore 9 when the lowermost fastener Ta has reached the stretching unit 13.

Figure 6:
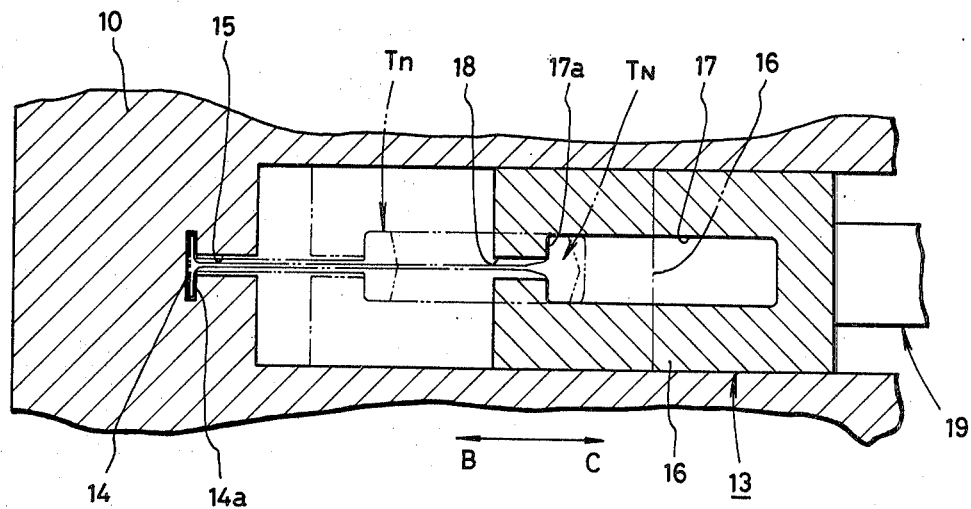
FIG. 6 is a sectional view taken along the line VI—VI in FIG. 3.
Figure 7:
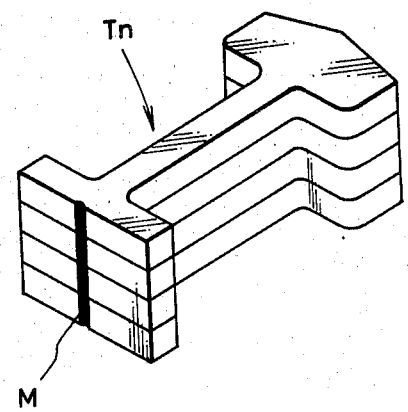
FIG. 7 is a perspective view of a fastener assembly in a non-stretched state.

The movable member 16 of the stretching unit 13 is originally in the position shown in phantom in FIG. 6. Accordingly, the wedge 26 is fitted in the tapered groove 24 to keep the holding bore 23 in an expanded state, so that the fasteners Ta are movable in the direction of an arrow A. The fasteners Ta lowered from the pool unit 20 to the interior of the joining unit 33 come into contact at intermediate portions of the bar sections 2 thereof with the heater 11 as the fasteners are passed through the joining unit 33, so that the fasteners Ta are fused together as shown in FIG. 7. Reference symbol M denotes fused portions of the fasteners. The fasteners Ta can be separated one by one from the fastener assembly by applying a blade of a cutter provided in a tag attacher. Thus, the fasteners Ta passing the heater 11 to reach the stretching unit 13 has already been in a fused state and in the form of the fastener assembly Tn.

The filament sections 3a of the fasteners of the fastener assembly Tn reaching the stretching unit 13 are stretched thereby. When the movable member 16 is displaced in the direction C of the dual arrow B-C by the cylinder 19, the filament sections 3a of the fasteners are stretched as the bar sections 2 of the fasteners and the head sections 1 thereof are held on the stepped portion 14a of the bore 14 and the stepped portion 17a of the bore 17, respectively.

In order to thermally stretch the filament sections 3a, they are preheated with a heating medium supplied into the recesses 29 in the pool unit 20.

While the fastener assembly Tn is stretched, the wedge 26 is out of the tapered groove 24. Accordingly, the pool block 21 is in a contracted state owing to the elasticity thereof to prevent the fasteners Ta in the pool block 21 from being lowered. However, as the fasteners Ta are forced into the guide bore 9 in order by the punch 5, the pool block 21 is displaced downwardly against the force of the spring 22 to allow the difference between the number of punched fasteners per unit time and the number of fasteners stretched in one stretching step to be regulated.

Figure 8:
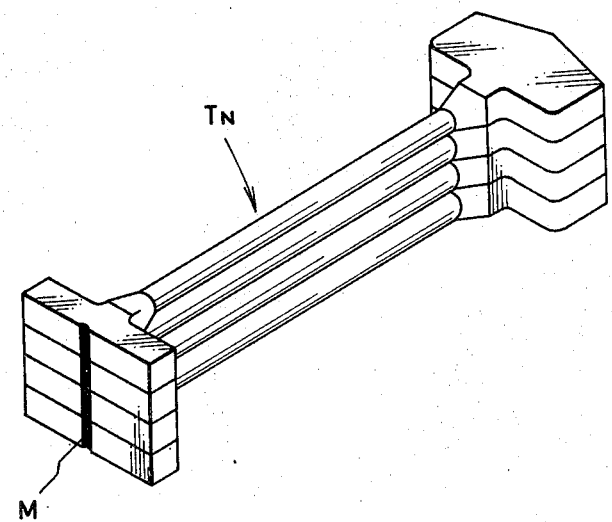
FIG. 8 is a perspective view of a fastener assembly in a stretched state.

After the filament sections 3a of the fasteners have been stretched, the movable member 16 is displaced in the direction B of the dual arrow B-C to return to the position shown in phantom in FIG. 6. At the same time, the wedge 26 is moved in the direction D of the dual arrow D-E to be forced into the tapered groove 24 is the pool block 21 again. Consequently, the pool block 21 is expanded, so that the fasteners Ta pooled in and above the pool block 21 are moved again in the direction of the arrow A. When the above-described stretching step is carried out repeatedly, the fastener assembly $T_N$ having stretched filament sections as shown in FIG. 8 is formed continuously. The fastener assembly $T_N$ is forced out continuously in the downward direction from the stretching unit 13, and the fastener assembly $T_N$ thus obtained is cut to a predetermined length so as to be shipped.

According to the method of the present invention described above, fasteners can be formed in a connected state, in which they are substantially in contact with one another in the direction of the thickness thereof. Accordingly, the fasteners are rarely intertwined while the fastener assemblies are transported or practically used in a price tag attaching operation. In fact, the fastener assemblies obtained by the method according to the present invention can be handled very easily as compared with conventional fastener assemblies of this kind.

According to the present invention, the number of the fasteners of one fastener assembly can be increased several times that of fasteners of one conventional fastener assembly. This allows the number of operations for inserting fastener assemblies into a tag attacher per unit time to be reduced accordingly, so that the efficiency of a price tag attaching operation can be improved to a great extent.

Since the fasteners of a fastener assembly obtained by the method according to the present invention are joined directly to one another unlike the fasteners of a conventional fastener assembly, which are joined together via connecting members, no useless parts which are other than the fasteners are left over during a price tag attaching operation. This allows the cost of material for the fasteners to be reduced greatly.

When it is not necessary to stretch the fasteners during the manufacture of fastener assemblies, a non-stretchable film or sheet 4 of a synthetic resin may be used.

Although the fasteners Ta in the above-described embodiments are punched out from one film or sheet of a synthetic resin, they may be obtained by subjecting a plurality of laminated films or sheets of a synthetic resin to a punching step.

The pool unit is not strictly necessary when the fastener assembly manufacturing apparatus in use is capable of equalizing the frequency of operations for forming fasteners Ta with the punch 5 with that of operations for stretching fasteners Ta.

As many apparently widely different embodiments of this invention may be made without departing from the spirit and scope thereof, it is to be understood that the invention is not limited to the specific embodiments thereof except as defined in the appended claims.

What is claimed is:

1. A method of manufacturing a continuous assembly of fasteners, each said fastener including a head section and a bar section joined together by a filament section comprising the steps of successively punching individual fasteners out of a sheet of synthetic resin material, successively delivering said fasteners in a downward direction so that said fasteners are laminated in a continuous stack of fasteners, heating the bar sections of said fasteners so that said bar sections are fused together to form a continuous assembly of joined fasteners, successively stretching the filament sections of said fasteners, and delivering said stacked, joined and stretched fasteners in a continuous assembly.

2. An apparatus for manufacturing a continuous assembly of fasteners, each said fastener including a head section and a bar section joined together by a filament section comprising punching means for successively punching individual fasteners out of a sheet of synthetic resin, laminating means positioned below said punching means for successively receiving said punched fasteners and for stacking said fasteners one on top of another, joining means positioned below said laminating means for joining the bar sections of said stacked fasteners together and stretching means positioned below said joining means for stretching said filaments of said joined, stacked fasteners, said joined, stacked and stretched fasteners being delivered from said stretching means in an endless, continuous manner.

3. An apparatus for manufacturing fastener assemblies according to claim 2, wherein said stretching means includes a body and a movable member, said body being provided with a groove through which said bar sections of said fasteners are passed, and a groove through which a part of each of said filament sections is passed, said movable member being provided with an elongated groove through which said head sections of said fasteners are passed, and a groove through which a part of each of said filament sections is passed.

4. An apparatus for manufacturing fastener assemblies according to claim 3, wherein said apparatus includes a pool unit provided between said laminating means and said joining means, said pool unit having a bore for holding said fasteners, and a tapered groove communicated with said holding bore and adapted to be engaged with a wedge fixed to said movable member of said stretching means, said pool unit being urged by a spring so as to contact said laminating means.

5. The apparatus as claimed in claim 2, wherein said joining means includes heating means for heating said bar sections of said fasteners so that said bar sections are releaseably fused together.

6. The apparatus as claimed in claim 5, further comprising a pool unit positioned below said laminating means for controlling the delivery of said stacked fasteners to said joining means.

7. The apparatus as claimed in claim 6, wherein said pool unit includes a bore substantially in the shape of said fasteners, said bore normally preventing the passage of said fasteners therethrough, said pool unit further including a tapered groove in communication with said bore and a wedge displaceable between a first position where said wedge is engaged with said tapered groove to expand said bore to permit the passage of said fasteners therethrough and a second position out of engagement with said tapered groove so that said fasteners cannot pass through said bore.

8. The apparatus as claimed in claim 7, wherein said pool unit includes biasing means for biasing said pool unit against said laminating means.

* * * * *